L. W. THOMPSON.
SPEED REGULATING SYSTEM.
APPLICATION FILED NOV. 26, 1920.
1,403,137.
Patented Jan. 10, 1922.
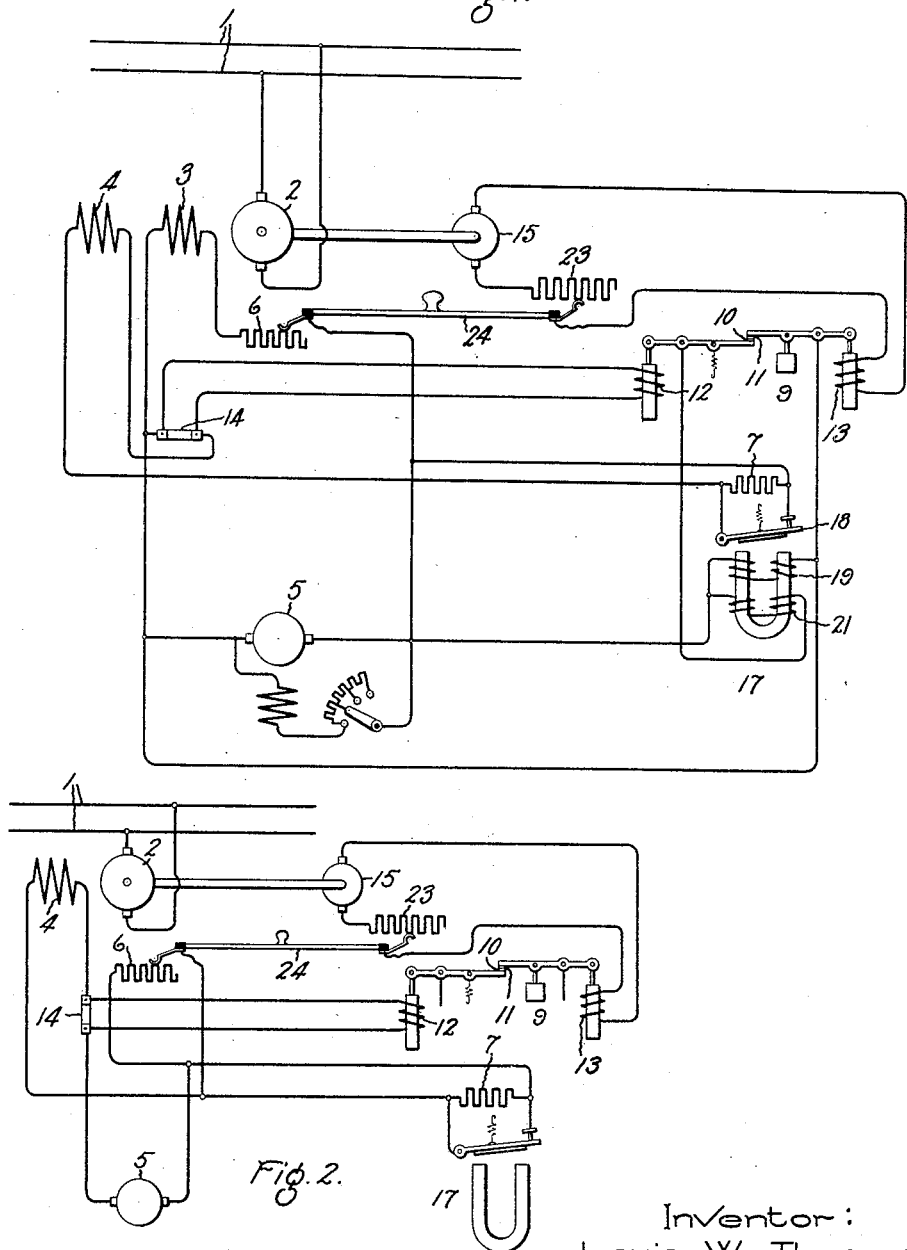
Inventor:
Louis W. Thompson,
by Albert G. Davis
His Attorney.

UNITED STATES PATENT OFFICE.

LOUIS W. THOMPSON, OF SCHENECTADY, NEW YORK, ASSIGNOR TO GENERAL ELECTRIC COMPANY, A CORPORATION OF NEW YORK.

SPEED-REGULATING SYSTEM.

1,403,137.  Specification of Letters Patent.  Patented Jan. 10, 1922.

Application filed November 26, 1920. Serial No. 426,363.

*To all whom it may concern:*

Be it known that I, LOUIS W. THOMPSON, a citizen of the United States, residing at Schenectady, in the county of Schenectady, State of New York, have invented certain new and useful Improvements in Speed-Regulating Systems, of which the following is a specification.

My invention relates to speed regulating systems for direct current motors, and particularly to systems in which the setting of the regulator can be adjusted so that it will maintain the speed of the motor constant at different values.

One object of my invention is to provide an arrangement whereby the speed of the motor may be maintained constant over a much greater range than it has been possible to maintain the speed constant with any of the arrangements used heretofore.

Another object of my invention is to provide an arrangement whereby the speed of the motor having a large field current may be maintained constant by means of a vibratory regulator over a wide range, without subjecting the contacts of the regulator to undue arcing and burning.

Another object of my invention is to provide means for adjusting simultaneously the setting of the regulator to change the speed to be maintained constant and the proportion of the total field current controlled by the regulator so that for all settings of the regulator it operates over substantially the same portion of its working range in maintaining the speed of the motor constant.

My invention will be better understood from the following description taken in connection with the accompanying drawing, and its scope will be pointed out in the appended claims.

Referring to the drawing, Fig. 1 is a diagram illustrating one embodiment of my invention; and Fig. 2 is a diagram illustrating a modification of the arrangement shown in Fig. 1.

Referring to Fig. 1 of the drawing, 1 represents a source of direct current which is supplied to a motor 2, the speed of which is to be maintained constant. The motor is provided with an exciting circuit comprising the field windings 3 and 4 which may be supplied with current from any suitable source. In the drawing, I have shown the windings as being connected in parallel across the terminals of an exciter 5, but it will be evident that if it were so desired these windings might be supplied with current from separate sources or from the source 1 instead of being separately excited.

In the circuit of the field winding 4 I provide a resistance 7, the effective value of which is controlled by a regulator 9, which may be any one of the well-known types of vibratory regulators, so as to vary the field of the motor to maintain the motor speed constant. It will be evident however that any other suitable regulating means may be used to control the current in the field winding 4 to maintain the motor speed constant. In order to be able to vary the total field current of the motor so as to vary the speed to be maintained constant, I provide the adjustable resistance 6 in the circuit of the field winding 3.

The particular construction of the regulator shown comprises two floating contacts 10 and 11 controlled by the solenoids 12 and 13 respectively. The solenoid 12 is connected to the resistance shunt 14 which is connected in the circuit of the field winding 4 so that the solenoid 12 is supplied with current proportional to the current flowing through the field winding 4. The solenoid 13 is supplied with current from the pilot generator 15 driven by the motor 2 and shown in the drawing as being connected to the same shaft. The pilot generator may be of any suitable type, but preferably of the magneto type and so arranged that the voltage thereof is proportional to the speed of the motor. Controlled by the contacts 10 and 11 of the regulator 9 is a relay 17 which acts upon a spring-held armature 18. This armature 18 is arranged to short-circuit the resistance 7 when not acted upon by the relay. The relay 17 is provided with the winding 19 which is connected directly across the terminals of the exciter 5 and a differential winding 21 which is adapted to be connected across the terminals of the exciter 5 when the contacts 10 and 11 are closed. When both of the windings 19 and 21 are energized the armature 18 occupies the position shown in the drawing, thereby short-circuiting the resistance 7, but when only the winding 19 is energized the armature 18 is attracted by the relay and the resistance 7 is inserted in the circuit of the field winding 4.

In circuit with the solenoid 13 and the generator 15 I provide an adjustable resistance 23 so that the setting of the regulator can be changed when it is desired to change the speed to be maintained constant by the regulator. The movable arms of the adjustable resistances 6 and 23 are preferably connected together in any desired manner, as by a rod 24 so that both of the resistances may be adjusted simultaneously. The steps of the resistances 6 and 23 are so designed that when the resistance 23 is varied to change the setting of the regulator, the resistance 6 is adjusted to vary the proportion of the total field current flowing through the field winding 3 so that for all settings of the regulator it operates over substantially the same portion of its working range in maintaining the speed of the motor constant. It is well known that the best regulation is obtained with a vibratory regulator when the regulator is working over that portion of its range where the contacts of the vibratory relay are in and out of engagement with each other an equal portion of the time. Therefore, by adjusting the current through the field winding 3 whenever the setting of the regulator is changed so that the regulator operates over this portion of its working range for all settings of the regulator the best regulation possible will be obtained. Furthermore, with this arrangement substantially all of the necessary change in the exciting current of the motor required to make the motor run at the new speed determined by the new setting of the regulator is produced in that portion of the exciting circuit controlled by the resistance 6. Therefore, substantially no change in the current through the portion of the exciting circuit controlled by the regulator is produced by changing the setting of the regulator. Consequently, with this arrangement I am able to maintain the speed of a motor constant over a much greater range than any arrangement used heretofore in which the amount of current controlled by the regulator is changed each time the setting of the regulator is changed. Furthermore, since the current flowing through the portion of the exciting circuit controlled by the regulator is only a portion of the total exciting current, and ordinarily is only a very small proportion, it is evident that my invention provides an arrangement for controlling the speed of motors having very large field currents. Therefore, an ordinary vibratory regulator may be used to maintain the speed of a motor constant over a wide range without subjecting the contacts of the regulator to undue arcing and burning.

The operation of the arrangement shown in Fig. 1 is as follows: Let it be assumed that the motor is running, that the exciter 5 is supplying current to the field windings 3 and 4 and that the resistances 6 and 23 have been adjusted to maintain the speed of the motor at a predetermined value, and that the contacts 10 and 11 are closed.

If the speed of the motor tends to vary from this predetermined value, due, for example, to a change in load or a change in voltage of the source 1, the voltage of the pilot generator 15 varies, thereby changing the current flowing through the solenoid 13 whereupon the regulator 9 operates to change the effective value of current flowing through field winding 4 to restore the speed of the motor to the predetermined value. For example, if the speed of the motor 2 decreases the voltage of the pilot generator 15 decreases thereby causing contact 11 to move out of engagement with contact 10. The opening of the contacts 10 and 11 deenergizes the winding 21 of the relay 17 so that the relay attracts the armature 18 thereby inserting the resistance 7 in the circuit of the field winding 4. The motor field is thereby decreased, resulting in an increase in the speed of the motor. As soon as the speed of the motor reaches such a value that the voltage of the pilot generator 15 is sufficient to cause the solenoid 13 to move the contact 11 into engagement with contact 10, the armature 18 of the relay 17 completes the short-circuit around the resistance 7 whereupon the motor field is increased and the speed of the motor is decreased.

In order to prevent the motor from hunting, which would result if the regulation depended solely upon the change in the voltage of the pilot generator 15, I arrange the contact 10 so that it will be moved toward the contact 11 in response to a decrease in the field current of the motor due to the opening of the contacts 10 and 11 and will be moved out of engagement with contact 11 in response to an increase in the field current of the motor due to the closing of the contacts 10 and 11. This operation of contact 10 is obtained by connecting the solenoid 12 so that the current therein varies in accordance with the current in the field winding 4. With this arrangement, it will be observed that the contact 10 will be in a state of constant vibration since the current through the field winding 4 is constantly varying a small amount due to the action of the floating contacts 10 and 11.

With the regulator arranged to hold constant speed at any particular value, the current in the solenoid 13 supplied from the pilot generator 15 is practically constant. If it is desired to adjust the regulator to hold another value of constant speed this is accomplished by moving the rod 24 in the proper direction, thereby simultaneously varying the resistances 6 and 23. As stated above the resistance 6 is so adjusted that when the motor is running at the new speed determined by the setting of the regulator, the regulator 9 operates over substantially the same portion of its working range in maintaining the speed constant as it did when the motor was running at its former speed.

In the modification shown in Fig. 2, the motor 2 is provided with only one field winding 4 and the resistances 6 and 7 are connected in multiple. In this arrangement the steps of the resistances 23 and 6 are so designed that when the resistance 23 is varied to change the setting of the regulator the resistance 6 is varied to change the exciting current of the motor and the proportion thereof flowing through the resistance 6 so that for all settings of the regulator it will operate over substantially the same portion of its working range in maintaining the speed of the motor constant. It will be evident that with this arrangement the resistance 6 is so designed that as the necessary changes in the current through the field winding 4 are produced to cause it to run at the new speed determined by the setting of the regulator, substantially no change in the amount of current through the portion of the exciting circuit comprising the resistance 7 and contacts 10 and 11. It is believed that the operation of the modification shown in Fig. 2 will be obvious from the description of the operation of the arrangement shown in Fig. 1 and therefore a detail description thereof is deemed unnecessary.

It will be apparent that while I have shown and described two modifications of my invention that various other modifications and changes may be made without departing from the true scope and spirit of my invention, and I, therefore, wish it to be understood that I do not desire to be limited to the exact arrangement shown, but seek to cover in the appended claims all those modifications and changes which fall within the true scope and spirit of my invention.

What I claim as new and desire to secure by Letters Patent of the United States, is:—

1. In combination, a direct current motor, an exciting circuit for said motor, a regulator for controlling the current in one portion of said exciting circuit to maintain the speed of the motor constant at any desired value, and means arranged to be operated simultaneously to vary the setting of said regulator to change the speed to be maintained constant and the proportion of the total field current flowing through another portion of said exciting circuit so that for all settings of the regulator it operates over substantially the same portion of its working range in maintaining the speed of the motor constant.

2. In combination, a direct current motor having two field windings, a regulator for controlling the current in one of said field windings to maintain the speed of the motor constant at any desired value, and means arranged to be operated simultaneously to vary the setting of said regulator to change the speed to be maintained constant and the current flowing through the field winding in which the current is not controlled by said regulator so that for all settings of the regulator it operates over substantially the same portion of its working range in maintaining the speed of the motor constant.

3. In combination, a direct current motor, an exciting circuit for said motor having two portions thereof connected in multiple, a generator driven by said motor, an adjustable resistance connected in one of said portions of said exciting circuit, a regulator for controlling the current in the other portion of said exciting circuit to maintain the speed of the motor constant at any desired value, comprising a resistance connected in the last-mentioned portion of said exciting circuit, and a solenoid supplied with current from said generator controlling a short-circuit around said resistance, an adjustable resistance connected in the circuit of said generator and solenoid, and means arranged to be operated simultaneously to vary said last-mentioned adjustable resistance to change the speed to be maintained constant by said regulator and said first-mentioned adjustable resistance to change the proportion of the total exciting current flowing therethrough so that for all settings of the regulator it operates over substantially the same portion of its working range in maintaining the speed of the motor constant.

4. In combination, a direct current motor having two field windings connected in multiple, a generator driven by said motor, an adjustable resistance connected in series with one of said field windings, a regulator for controlling the current in the other of said field windings to maintain the speed of the motor constant at any desired value, comprising a resistance connected in series with said last-mentioned field winding, and a solenoid supplied with current from said generator controlling a short-circuit around said resistance, an adjustable resistance connected in the circuit of said generator and solenoid, and means arranged to be operated simultaneously to vary said last-mentioned adjustable resistance to change the speed to be maintained constant by said regulator and said first-mentioned adjustable resistance to vary the proportion of the total exciting current flowing through said first-mentioned field winding so that for all settings of the regulator it operates over substantially the same portion of its working range in maintaining the speed of the motor constant.

5. In combination, a direct current motor, an exciting circuit for said motor having two portions thereof connected in multiple, a generator driven by said motor, an adjustable resistance in circuit with one of said portions of said exciting circuit, a second resistance connected in the other portion of said exciting circuit, a relay for short-circuiting said second resistance, a pair of contacts controlling said relay, a solenoid controlling one of said contacts supplied with current proportional to the current in said last mentioned portion of said exciting circuit, another solenoid controlling the other one of said contacts supplied with current from said generator, an adjustable resistance in circuit with said last-mentioned solenoid and said generator, and means arranged to vary simultaneously said adjustable resistances.

6. In combination, a direct current motor having two field windings connected in multiple, a generator driven by said motor, an adjustable resistance in circuit with one of said field windings, a second resistance connected in circuit with the other of said field windings, a relay for short-circuiting said second resistance, a pair of contacts controlling said relay, a solenoid controlling one of said contacts supplied with current proportional to the current in said last-mentioned field winding, another solenoid controlling the other one of said contacts supplied with current from said generator, an adjustable resistance in circuit with said last-mentioned solenoid and said generator, and means for simultaneously adjusting said adjustable resistances.

In witness whereof, I have hereunto set my hand this 24th day of November, 1920.

LOUIS W. THOMPSON.